US012793706B2

(12) United States Patent
Avijeet

(10) Patent No.: US 12,793,706 B2
(45) Date of Patent: Nov. 10, 2026

(54) SPEECH RECOGNITION SYSTEMS AND METHODS

(71) Applicant: Telepathy Labs, Inc., Tampa, FL (US)

(72) Inventor: Vijeta Avijeet, Zurich (CH)

(73) Assignee: Telepathy Labs, Inc., Tampa, FL (US)

( * ) Notice: Subject to any disclaimer, the term of this patent is extended or adjusted under 35 U.S.C. 154(b) by 501 days.

(21) Appl. No.: 17/640,442

(22) PCT Filed: Aug. 27, 2020

(86) PCT No.: PCT/US2020/048149
§ 371 (c)(1),
(2) Date: Mar. 4, 2022

(87) PCT Pub. No.: WO2021/045955
PCT Pub. Date: Mar. 11, 2021

(65) Prior Publication Data

US 2022/0328039 A1 Oct. 13, 2022

Related U.S. Application Data

(60) Provisional application No. 62/895,792, filed on Sep. 4, 2019.

(51) Int. Cl.
*G10L 15/183* (2013.01)
*G10L 15/07* (2013.01)

(52) U.S. Cl.
CPC .......... *G10L 15/183* (2013.01); *G10L 15/075* (2013.01)

(58) Field of Classification Search
CPC ..... G10L 15/183; G10L 15/075; G10L 15/30; G10L 2015/226; G10L 15/063;
(Continued)

(56) References Cited

U.S. PATENT DOCUMENTS 5,899,973 A * 5/1999 Bandara ................ G10L 15/197
704/238
8,805,684 B1 * 8/2014 Aleksic ................... G10L 15/07
704/270.1

(Continued)

FOREIGN PATENT DOCUMENTS

| | | | |
|---|---|---|---|
| KR | 20150100322 A | * | 9/2015 |
| KR | 1020150100322 A | | 9/2015 |
| WO | 2006/037219 A1 | | 4/2006 |

OTHER PUBLICATIONS

International Search Report and Written Opinion issued on Nov. 25, 2020 in related International Application No. PCT/US2020/048149.

(Continued)

*Primary Examiner* — Andrew C Flanders
(74) *Attorney, Agent, or Firm* — Michael T. Abramson; Jordan IP Law, LLC

(57) ABSTRACT

A speech processing system and a method therefor is provided. The speech processing system may capture one or more speech signals. Each of the one or more speech signals may include at least one dialogue uttered by a user. Dialogues may be extracted from the one or more speech signals. Frequently uttered dialogues may be identified over a period of time. The frequently uttered dialogues may be a set of dialogues that are uttered by the user a number of times during the period of time more than other dialogues uttered by the user during the period of time. A local language model and a local acoustic model may be generated based on, at least in part, the frequently uttered dialogues. The one or more speech signals may be processed based on, at least in part, the local language model and the local acoustic model.

18 Claims, 7 Drawing Sheets

10

(58) Field of Classification Search
CPC ..... G10L 15/28; G10L 15/16; G10L 15/1815; G10L 15/1822; G10L 15/22; G10L 15/26; G10L 2015/223; G06F 3/167; G06F 40/30; G06F 40/35
See application file for complete search history.

(56) References Cited

U.S. PATENT DOCUMENTS

| | | | | |
|---|---|---|---|---|
| 8,880,398 | B1 * | 11/2014 | Aleksic | G10L 15/07 704/235 |
| 9,070,367 | B1 * | 6/2015 | Hoffmeister | G10L 15/30 |
| 11,735,184 | B2 * | 8/2023 | Li | G10L 15/183 704/235 |
| 2002/0087309 | A1 | 7/2002 | Lee et al. | |
| 2013/0144618 | A1 * | 6/2013 | Sun | G10L 15/30 704/243 |
| 2013/0151250 | A1 * | 6/2013 | VanBlon | G10L 15/30 704/235 |
| 2013/0275164 | A1 * | 10/2013 | Gruber | G06F 16/2457 705/5 |
| 2016/0012817 | A1 | 1/2016 | Plumpe et al. | |
| 2017/0372696 | A1 * | 12/2017 | Lee | G10L 15/063 |
| 2019/0341056 | A1 * | 11/2019 | Paulik | G10L 15/063 |
| 2020/0349920 | A1 * | 11/2020 | Al Bawab | G06N 3/09 |

OTHER PUBLICATIONS

Communication under Rule 71(3) EPC for Intent to Grant for European Application No. 20861224.2-1207 mailed Apr. 17, 2025, 62 pages.

Written Opinion for Singapore Application No. 11202201729V mailed Dec. 25, 2024, 7 pages.

First Examination report for European Application No. 20861224.2-1207 mailed Oct. 2, 2024, 7 pages.

Search Report for European Patent Application No. 25190548.5 mailed Nov. 11, 2025, 10 pages.

Kleinert et al: "Semi-supervised Adaptation of Assistant Based Speech Recognition Models for different Approach Areas", 2018 IEEE/AIAA 37th Digital Avionics Systems Conference (DASC), IEEE, Sep. 23, 2018 (Sep. 23, 2018), XP033469467, DOI: 10.1109/DASC.2018.8569879, 10 pages.

Exam Report for European Application No. 25190548.5 mailed Jun. 17, 2026, 5 pages.

Notice of Eligibility for Grant with Exam Report for Singapore Application No. 11202201729V mailed Jul. 23, 2026, 4 pages.

* cited by examiner

300

400

500

| Rank No. | Dialogue Topics | Frequency Percentage |
|---|---|---|
| 1 | Sports | 40% |
| 2 | Weather | 30% |
| 3 | Food | 15% |
| 4 | Entertainment | 10% |
| 5 | News | 5% |

FIG. 4A

| Rank No. | Dialogue Sub-Topics for Sports | Frequency Percentage |
|---|---|---|
| 1 | Football | 35% |
| 2 | Baseball | 25% |
| 3 | Soccer | 15% |
| 4 | Hockey | 15% |
| 5 | Basketball | 10% |

FIG. 4B

| Rank No. | Dialogues | Frequency Per week |
|---|---|---|
| 1 | What is the score of today's local football game? | 25 |
| 2 | What are the divisional standings for our local football team? | 20 |
| 3 | What is today's local weather? | 15 |
| 4 | What time is today's local baseball game? | 10 |
| 5 | Where does the local basball team play today? | 8 |

FIG. 4C

SPEECH RECOGNITION SYSTEMS AND METHODS

CROSS-REFERENCE TO RELATED APPLICATIONS

This application is a U.S. National Stage of International Patent Application No. PCT/US2020/048149, filed on 27 Aug. 2020, which claims the benefit of U.S. Provisional Application Ser. No. 62/895,792, filed on 4 Sep. 2019. The disclosures of which are incorporated herein by reference in their entirety.

RELATED CASES

This application claims the benefit of U.S. Provisional Application No. 62/895,792, filed on 4 Sep. 2019, the contents of which are all incorporated by reference.

BACKGROUND

Speech recognition, also known as automatic speech recognition (ASR) or voice recognition, generally refers to technology that recognizes speech and converts spoken words to text or to commands or directions to be followed by a computing system or systems. Speech recognition represents a technique for human speech understanding and for enabling a machine with simulated intelligence to recognize user-voiced commands and dialogue.

BRIEF SUMMARY OF DISCLOSURE

In an example implementation, a speech processing system may comprise one or more processors and one or more memories configured to perform operations. The operations may include capturing one or more speech signals. Each of the one or more speech signals may include at least one dialogue uttered by a user. Dialogues may be extracted from the one or more speech signals. Frequently uttered dialogues may be identified over a period of time. The frequently uttered dialogues may be a set of dialogues that are uttered by the user a number of times during the period of time more than other dialogues uttered by the user during the period of time. A local language model and a local acoustic model may be generated based on, at least in part, the frequently uttered dialogues. The one or more speech signals may be processed based on, at least in part, the local language model and the local acoustic model.

In one or more example implementations, extracting the dialogues from the one or more speech signals may include implementing a remote language model and a remote acoustic model for extracting the dialogues from the one or more speech signals. The local language model and the local acoustic model may be subsets of the remote language model and the remote acoustic model, respectively.

In one or more example implementations, the local language model and the local acoustic model may be executed on a user device. The remote language model and the remote acoustic model may be executed remotely from the user device on at least one server.

In one or more example implementations, the dialogues may be categorized into different domains.

In one or more example implementations, after categorizing the dialogues into different domains, the categorized dialogues may be ranked in each of the domains based on, at least in part, a frequency of utterance of each of the dialogues by the user over the period of time, such that the dialogues with a higher frequency of utterance may be ranked higher as compared to the dialogues with a relatively lower frequency of utterance in the corresponding domain.

In one or more example implementations, identifying frequently uttered dialogues may include identifying a predefined number of dialogues with high rankings in each of the domains as the frequently uttered dialogues.

In one or more example implementations, the predefined number of dialogues may be determined based on, at least in part, one or more of a memory and a processor of a user device.

In one or more example implementations, the domains may include one or more of food, entertainment, sports, scheduling, sales inquiry, and automation commands.

In another example implementation, the speech processing system may comprise one or more processors and one or more memories configured to perform operations including capturing one or more speech signals. Each of the one or more speech signals may include at least one dialogue uttered by a user. A local language model and a local acoustic model may be received from a remote automatic speech recognition (ASR) engine. The local language model and the local acoustic model may be stored. The local language model and the local acoustic model may be based on, at least in part, frequently uttered dialogues over a period of time. The frequently uttered dialogues may be a set of dialogues that are uttered by the user a number of times during the period of time more than other dialogues uttered by the user during the period of time. The one or more speech signals may be processes based on, at least in part, the language model and the acoustic model.

In one or more example implementations, the local language model and the local acoustic model may be associated with a user profile of the user. Storing the local language model and the local acoustic may include storing the local language model and the local acoustic model in a memory of a user device linked with the user profile of the user.

In one or more example implementations, processing the one or more speech signals may include executing a local ASR engine on a user device to process the one or more speech signals based on, at least in part, the local language model and the local acoustic model.

In yet another example implementation, a remote speech processing system may include one or more processors and one or more memories configured to perform operations including receiving one or more speech signals from a user device. Each of the one or more speech signals may include at least one dialogue uttered by a user. Dialogues may be extracted from the one or more speech signals. Frequently uttered dialogues may be identified over a period of time. The frequently uttered dialogues may be a set of dialogues that are uttered by the user a number of times during the period of time more than other dialogues uttered by the user during the period of time. A local language model and a local acoustic model may be generated for the user based on, at least in part, the frequently uttered dialogues by the user. The local language model and the local acoustic model may be sent to the user device to be used in processing of the one or more speech signals.

In one or more example implementations, the local language model and the local acoustic model may be associated with a user profile of the user.

In one or more example implementations, extracting dialogues from the one or more speech signals may include implementing a remote ASR engine including a remote language model and a remote acoustic model for extracting the dialogues from the one or more speech signals. The local language model and the local acoustic model may be subsets of the remote language model and the remote acoustic model, respectively. The remote ASR engine may be executed remotely from the user device on at least one server. At least a portion of the remote ASR engine may be executed locally on the user device.

In one or more example implementations, the local language model and the local acoustic model may be used by a local ASR engine on the user device.

In one or more example implementations, the dialogues may be categorized into different domains. After categorizing the dialogues into different domains, the categorized dialogues may be ranked in each of the domains based on, at least in part, a frequency of utterance of each of the dialogues by the user over the period of time, such that the dialogues with a higher frequency of utterance may be ranked higher as compared to the dialogues with a relatively lower frequency of utterance in the corresponding domain.

In one or more example implementations, identifying frequently uttered dialogues may include identifying a predefined number of dialogues with high rankings in each of the domains as the frequently uttered dialogues. The predefined number of dialogues may be determined based, at least in part, one or more of a memory and a processor of the user device.

In one or more example implementations, the domains may include one or more of food, entertainment, sports, scheduling, sales inquiry, and automation commands.

In still another example implementation, a computer implemented method for processing speech is provided. The method may comprise receiving one or more speech signals. Each of the one or more speech signals may include at least one dialogue uttered by a user. Dialogues may be extracted from the one or more speech signals. Frequently uttered dialogues may be identified over a period of time. The frequently uttered dialogues may be a set of dialogues that are uttered by the user a number of times during the period of time more than other dialogues uttered by the user during the period of time. A local language model and a local acoustic model may be generated based on, at least in part, the identified frequently uttered dialogues. The one or more speech signals may be processed from the user based on, at least in part, the local language model and the local acoustic model.

In one or more example implementations, a remote language model and a remote acoustic model may be implemented for generating the local language model and the local acoustic model. The local language model and the local acoustic model may be subsets of the remote language model and the remote acoustic model, respectively.

In one or more example implementations, the local language model and the local acoustic model may be stored for later retrieval.

In one or more example implementations, the dialogues may be categorized into different domains.

In one or more example implementations, the categorized dialogues may be ranked in each of the domains based on, at least in part, a frequency of utterance of each of the dialogues by the user over the period of time, such that the dialogues with a higher frequency of utterance are ranked higher as compared to the dialogues with a relatively lower frequency of utterance in the corresponding domain.

In one or more example implementations, the identifying frequently uttered dialogues may include identifying a predefined number of dialogues with high rankings in each of the domains as the frequently uttered dialogues.

In one or more example implementations, the domains may include one or more of food, entertainment, sports, scheduling, sales inquiry, and automation commands.

Other example implementations may include: a speech processing system, a method of speech processing, a computer-implemented method, a computing system including one or more processors and one or more memories that may be configured to perform operations, a computer program product residing on a computer readable storage medium having a plurality of instructions stored thereon, and an apparatus.

The details of one or more example implementations are set forth in the accompanying drawings and the description below. Other possible example embodiments, features, aspects, and/or possible example advantages will become apparent from the description, the drawings, and the claims. Some implementations may not have those possible example features and/or possible example advantages, and such possible example embodiments, features, aspects, and/or possible example advantages may not necessarily be required of some implementations.

BRIEF DESCRIPTION OF THE DRAWINGS

FIG. 4A is an example of a table storing top dialogue topics according to one or more example implementations of the disclosure;

FIG. 4B is an example of a table storing top dialogue sub-topics according to one or more example implementations of the disclosure;

FIG. 4C is an example of a table storing top dialogues according to one or more example implementations of the disclosure.

Like reference symbols in the various drawings indicate like elements.

DETAILED DESCRIPTION

Figure 1:
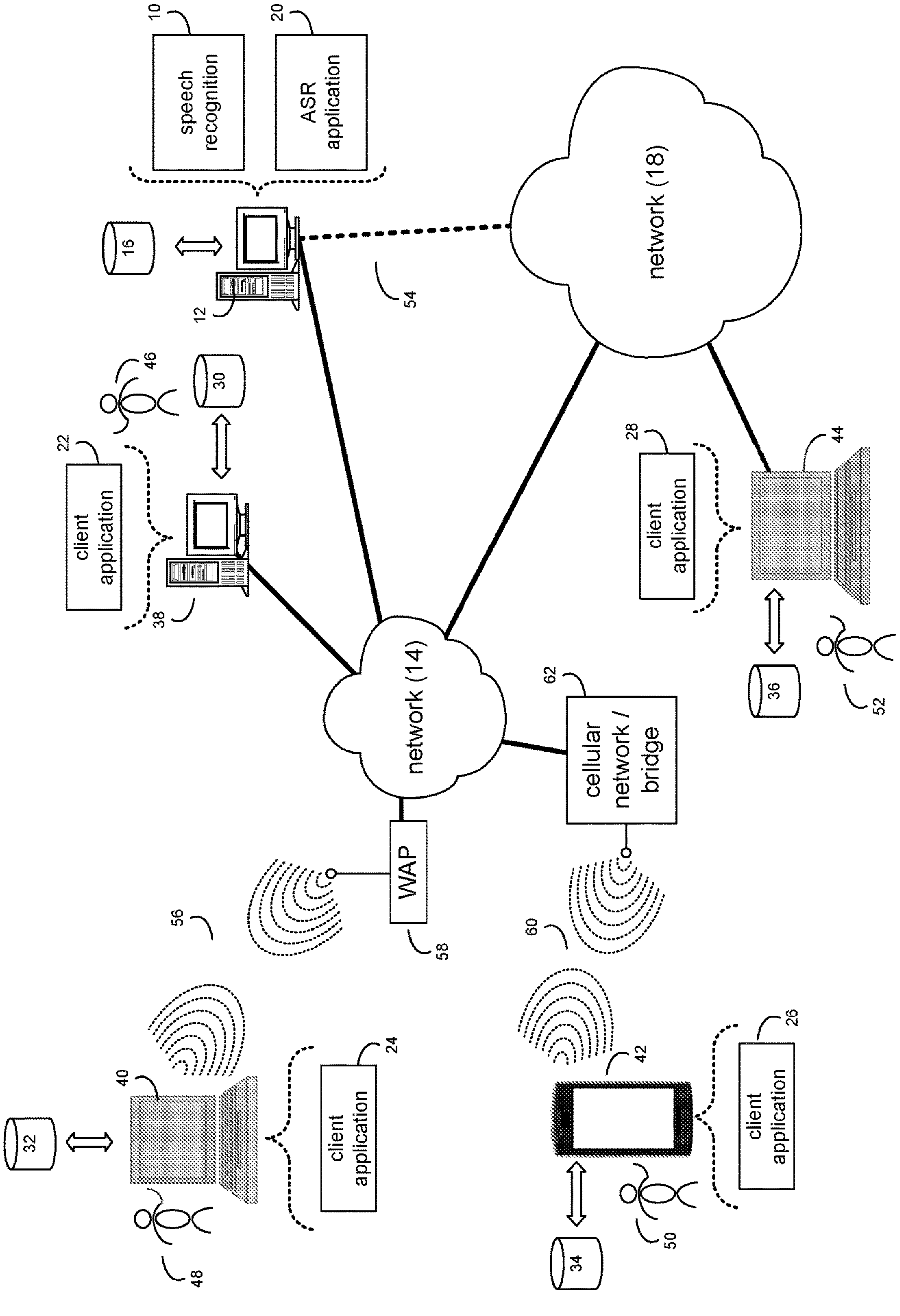
FIG. 1 is an example diagrammatic view of a speech recognition process coupled to an example distributed computing network according to one or more example implementations of the disclosure.

Some speech processing systems implement large and extensive language and acoustic models for carrying out speech recognition processes. Implementing such speech processing systems can be computationally and bandwidth (e.g., memory and data transmission) intensive which may not be feasible for portable and embedded devices, such as, for example, mobile phones and automotive navigation systems. Such implementation may further cause large battery consumption which is also not desirable for portable and embedded devices. Also, such larger implementations (e.g., using large language and acoustic models) may have lower quality recognition processing compared to smaller implementations (e.g., smaller language and acoustic models). Some speech processing systems may execute speech recognition processes in cloud systems hosted on remote servers. However, such arrangements have their example and non-limiting disadvantages, that may include high latency due to remote connection, high battery consumption for maintaining data communication, possibly lesser quality speech recognition, and the like.

Speech processing technologies may be used for, e.g., digital speech coding, spoken language dialogue systems, text-to-speech synthesis, and automatic speech recognition. Information (such as speaker, gender, or language identification, or speech recognition) may be extracted from speech. Speech may be a more intuitive way of accessing information, controlling things, and communicating, as it is hands-free, eyes-free, fast, and intuitive. Recently speech and other types of natural language are experiencing an increased acceptance when being used for interacting with "intelligent" computing systems. Speech recognition applications may include, but are not limited to, voice user interfaces such as voice dialing, call routing, control of building convenience or comfort features (e.g., lighting, appliances, climate control, entertainment, etc.), database searching (e.g., for either local databases or networked databases such as those accessible via a local area or wide area network such as the Intranet), data entry, preparation of structured documents, speech-to-text processing for transcription or composing of documents such as letters or e-mails or the like, hands-free computing, control of vehicle functions, or the like. To perform such tasks, high speech recognition accuracy may be required.

The present disclosure generally relates to a speech processing system which may include a large remote automatic speech recognition (ASR) engine (e.g., cloud ASR or large vocabulary ASR, referred to below as a remote ASR engine) in communication with a small ASR engine (e.g., embedded small ASR on device, referred to below as a local ASR engine), and in which the remote ASR engine may train the local ASR engine and also may store information over time for the local ASR engine. The local ASR engine may be generally defined as an ASR system or process that may run entirely locally on a device without any need to send data over any network. The remote ASR engine may be generally defined as a server-side ASR system that may be capable of running relatively large models that may not be capable of being run on a local device (e.g., remote ASR engine may use a complex neural network or complex software for running models that cannot be run on a local device in real time). Further, the remote ASR engine may be generally defined as the ASR system capable of generating one or more compatible model(s) for the local ASR engine. For example, the remote ASR engine may create a language model and acoustical adaptation for the local ASR engine so that the local ASR engine knows the most frequently asked questions by a user with higher accuracy and then may store this information over time (e.g., every hour). Specifically, the remote ASR engine may train the local ASR engine with most frequently asked questions offline and then push back the language model and acoustical adaptation to the local ASR engine. Furthermore, the remote ASR engine may constantly update (e.g., incrementally update) a memory (e.g., cache) of the local ASR engine to provide new models based on the user.

In some examples, a micro service architecture may be implemented for multiple ASR engines that function in parallel (e.g., remote ASR engine may be a cloud ASR while local ASR engine may be embedded on a device). Further, the local ASR engine (e.g., embedded on the device) may not need to always be connected to remote ASR engine (e.g., cloud ASR). In some examples, this remote ASR cloud engine may collect speech signals (e.g., from a user) and train a language model and an acoustic model for the local ASR engine. The acoustic model of local ASR engine may be a generic acoustic model that deals with noise which may be updated incrementally over time from the remote ASR engine.

The speech processing system may include learning language models and acoustical environment with a remote ASR engine in the cloud and a local ASR engine on a personal electronic device (e.g., such as a mobile phone). In some examples, some language models may include word models, sentence models, or combinations thereof. Further, the sentence models may recognize frequent sentences (also referred to as top sentences) and the word models may recognize frequent words (also referred to as top words). A number or size of the frequent sentences and/or frequent words may be restricted by the size of the memory and/or size of the processor of a user device such as the personal electronic device (e.g., threshold for frequent sentences and/or words that may be included in sentence models and/or word models may be based on size of memory and/or size of processor of the user device). In other examples, the number or size of the frequent sentences and/or frequent words may be restricted by the preferred quality threshold percentage (e.g., 90-95% quality). As the size increases, the quality percentage may decrease such that the size of the frequent sentences and/or frequent words may be restricted based on this quality threshold.

Whether sentences or words may be considered may be based on weighted relationship of how many times sentences or words are repeated with respect to other dialogues (especially other repeated dialogues) and not based on a threshold number per se (e.g., phrase is said five or six times). As described in more detail below, "frequent" words or sentences may be determined by using weighting criteria (e.g., number of times user speaks about a topic is weighted against other dialogues particularly other repeated dialogues). Additionally, the weighting criteria may be used to increase the ranking of some dialogues (such as based on topics, subtopics, etc.) compared to other dialogues based, at least in part, on events. For example, within a ranked list, dialogue about a preferred store for buying gifts for an anniversary may be ranked low on list based on day-to-day historical records (e.g., after top ten topics such top ten stores where a specific sports store is ranked number 10). When the anniversary becomes an upcoming event, this topic of dialogue about the preferred store is additionally weighted to increase its relevance such that this anniversary store dialogue may be moved higher in rankings such as within top ten list (e.g., possibly above sports store). The weighting for this upcoming event may change (in real time) as the event becomes closer in time and may be ranked higher or lower in relationship to other ranked dialogue topics that are weighted higher/lower based on frequency of use during the day.

The speech processing system may provide machine learning of individual user language and/or commonly spoken conversations (e.g., frequent questions, statements, etc.) from user. Thus, the speech processing system may generally learn habits of user through learning common or frequently spoken conversations. Then, the speech processing system may update a language pack and adapted acoustic model in real-time constantly so that virtually customized conversations may be available offline (e.g., when not connected to the network), and the accuracy of the local ASR engine may be improved for those common spoken conversations. In some examples, the virtually customized conversations may be available and accessed offline either by a user, customer, or by other lightweight directory access protocol (LDAP) designations. This may provide real-time speech recognition improvement. For example, preferences (e.g., frequently spoken conversations) may be stored or cached and made available on a user device such that during offline usage, the data that is needed by the speech processing system may still be made available in real-time.

In some examples, the speech processing system may categorize frequently used dialogue conversations into various domains like food, entertainment, sports, machine part selection, sales inquiry, etc. Thus, frequently stored dialogue may be stored with respect to one or more of these domains such that the system may be configured to determine frequently used dialogue for sports, greetings, food, etc. In some examples, the speech processing system may store frequently stored dialogue in the form of one shot dialogue (e.g., in form of questions and answers for a question and answering type of system).

In some examples, some aspects of speech processing may be handled by a neural network. A deep learning method involving recurrent neural network (RNN) may be used in processing speech recognition. In some examples, the speech processing may be accomplished without the use of neural networks. Examples of speech processing that do not use neural networks may include, but are not be limited to, using Hidden Markov model (HMM) processing, HMM-derived processing, Gaussian mixture model (GMM)-based processing, GMM-HMM processing, etc.

System Overview:

In some implementations, the present disclosure may be embodied as a system, method, apparatus, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures show the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function (s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown speech recognition process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a speech recognition process, such as speech recognition process 10 of FIG. 1, may comprise receiving one or more speech signals. Each of the one or more speech signals may comprise at least one dialogue uttered by a user. The process may also comprise identifying frequently uttered dialogues over a period of time. The process may further comprise generating a language model and an acoustic model based on the identified frequently uttered dialogues. The process may further comprise processing the subsequent one or more speech signals from the user based on the generated language model and the acoustic model.

In some implementations, the instruction sets and subroutines of the speech recognition process 10, which may be stored on storage device, such as storage device 16, coupled to computer 12, may be executed by one or more processors and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, speech recognition process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute an automatic speech recognition (ASR) application (e.g., ASR application 20), examples of which may include, but are not limited to, e.g., an automatic speech recognition (ASR) application (e.g., modeling, etc.), a virtual assistant application, a web conferencing application, a standard and/or mobile web browser, a website application, a speech signal enhancement (SSE) application (e.g., multi-zone processing/beamforming, noise suppression, etc.), a voice biometrics/wake-up-word processing application, a speaker identification application, a speaker verification application, a voice-over-IP application, a video-over-IP application, an Instant Messaging (IM)/"chat" application, a short messaging service (SMS)/multimedia messaging service (MMS) application, a virtual meeting application, an email application (e.g., an email client application), a textual and/or a graphical user interface, a customized web browser, a plugin, an Application Programming Interface (API), a custom application, or other application that allows for speech recognition and/or remote collaboration. In some implementations, speech recognition process 10 and/or ASR application 20 may be accessed via one or more of client applications 22, 24, 26, 28. In some implementations, speech recognition process 10 may be a standalone application, or may be an applet/application/script/extension that may interact with and/or be executed within ASR application 20, a component of ASR application 20, and/or one or more of client applications 22, 24, 26, 28. In some implementations, ASR application 20 may be a standalone application, or may be an applet/application/script/extension that may interact with and/or be executed within speech recognition process 10, a component of speech recognition process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of speech recognition process 10 and/or ASR application 20. Examples of client applications 22, 24, 26, 28 may include, but are not limited to, e.g., an ASR application (e.g., modeling, etc.), a virtual assistant application, a web conferencing application, a standard and/or mobile web browser, a website application, a speech signal enhancement (SSE) application (e.g., multi-zone processing/beamforming, noise suppression, etc.), a voice biometrics/wake-up-word processing application, a speaker identification application, a speaker verification application, a voice-over-IP application, a video-over-IP application, an Instant Messaging (IM)/"chat" application, a short messaging service (SMS)/multimedia messaging service (MMS) application, a virtual meeting application, an email application (e.g., an email client application), a textual and/or a graphical user interface, a customized web browser, a plugin, an Application Programming Interface (API), a custom application, or other application that allows for speech recognition and/or remote collaboration. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™ Apple® iOS®, Mac® OS X®; Red Hat® Linux®, or a custom operating system.

In some implementations, one or more of client applications 22, 24, 26, 28 may be configured to effectuate some or all of the functionality of speech recognition process 10 (and vice versa). Accordingly, in some implementations, speech recognition process 10 may be a purely server-side application, a purely client-side application, or a hybrid server-side/client-side application that is cooperatively executed by one or more of client applications 22, 24, 26, 28 and/or speech recognition process 10.

In some implementations, one or more of client applications 22, 24, 26, 28 may be configured to effectuate some or all of the functionality of ASR application 20 (and vice versa). Accordingly, in some implementations, ASR application 20 may be a purely server-side application, a purely client-side application, or a hybrid server-side/client-side application that is cooperatively executed by one or more of client applications 22, 24, 26, 28 and/or ASR application 20. As one or more of client applications 22, 24, 26, 28, speech recognition process 10, and ASR application 20, taken singly or in any combination, may effectuate some or all of the same or similar functionality, any description of effectuating such functionality via one or more of client applications 22, 24, 26, 28, speech recognition process 10, ASR application 20, or combination thereof, and any described interaction(s) between one or more of client applications 22, 24, 26, 28, speech recognition process 10, ASR application 20, or combination thereof to effectuate such functionality, should be taken as an example only and not to limit the scope of the disclosure.

In some implementations, one or more of users 46, 48, 50, 52 may access computer 12 and speech recognition process 10 (e.g., using one or more of client electronic devices 38, 40, 42, 44) directly through network 14 or through secondary network 18. Further, computer 12 may be connected to network 14 through secondary network 18, as shown with phantom link line 54. Speech recognition process 10 may include one or more user interfaces, such as browsers and textual or graphical user interfaces, through which users 46, 48, 50, 52 may access speech recognition process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
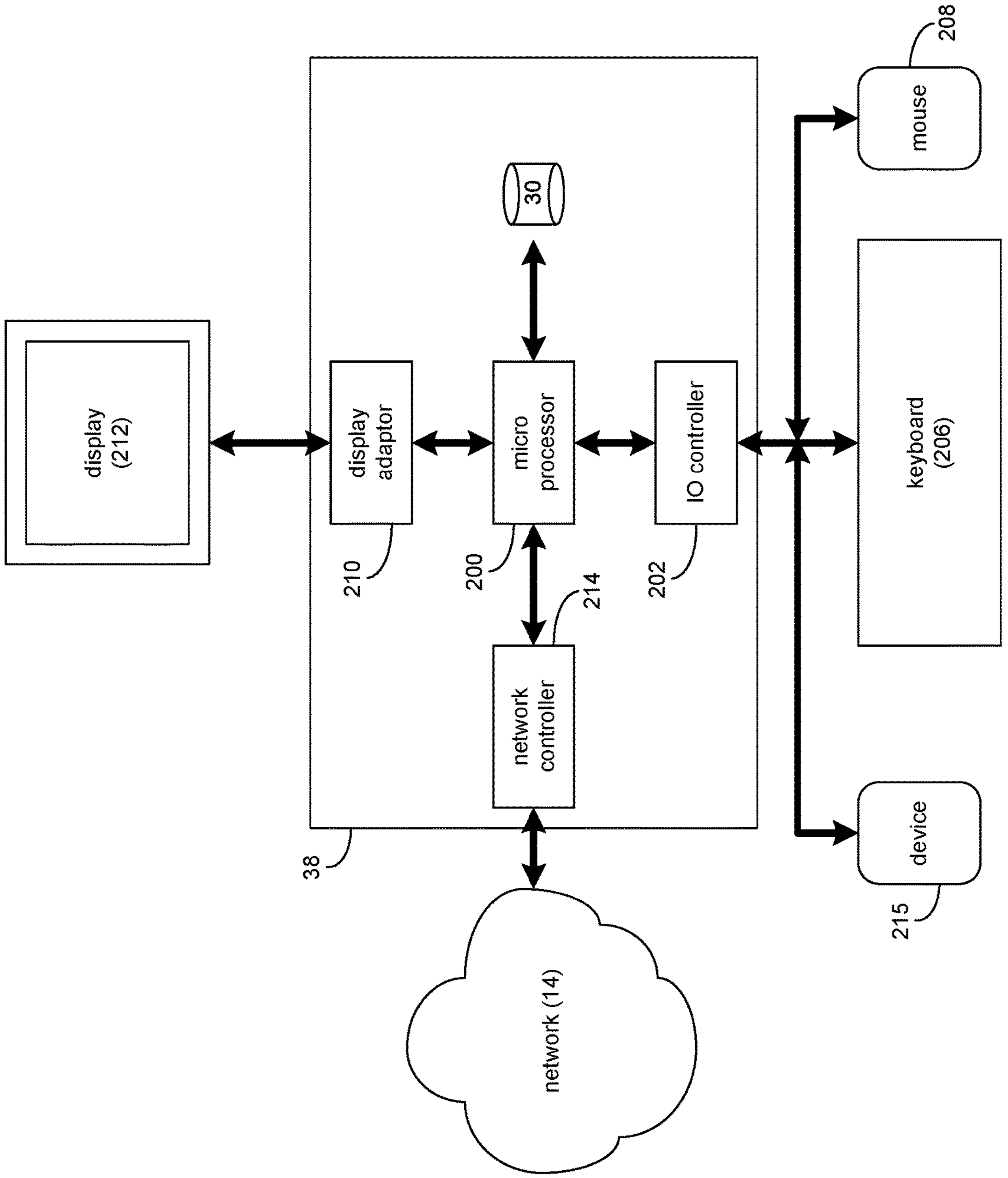
FIG. 2 is an example diagrammatic view of a client electronic device of FIG. 1, according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, speech recognition process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor and/or microprocessor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, the speech recognition process 10 may at least help, e.g., improve existing technological processes associated with, e.g., processing of speech signals for speech recognition. It will be appreciated that the computer processes described throughout are integrated into one or more practical applications, and when taken at least as a whole are not considered to be well-understood, routine, and conventional functions.

Figure 5:
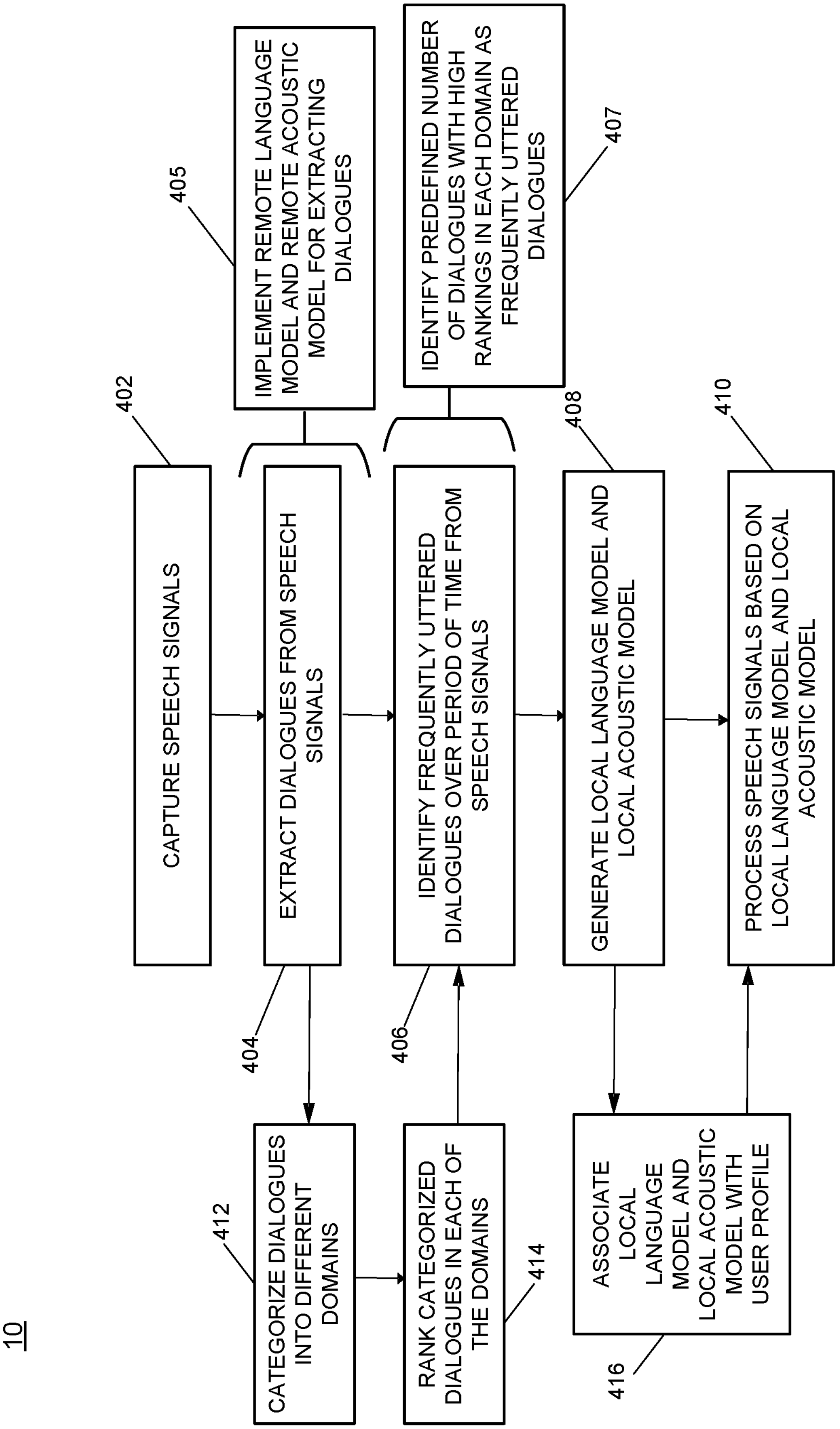
FIG. 5 is an example flowchart of a speech processing process, according to one or more example implementations of the disclosure.

Speech Processing System:

As discussed above and referring also at least to the example implementations of FIGS. 3-5. Referring to the example implementation of FIG. 5, speech recognition process 10 may capture 402 one or more speech signals. Each of the one or more speech signals may include at least one dialogue uttered by a user. Speech recognition process 10 may extract 404 dialogues from the one or more speech signals. The speech recognition process 10 may identify 406 frequently uttered dialogues over a period of time. The frequently uttered dialogues may be a set of dialogues that are uttered by the user a number of times during the period of time more than other dialogues uttered by the user during the period of time. A local language model and a local acoustic model may be generated 408 based on, at least in part, the frequently uttered dialogues. The speech recognition process 10 may process 410 the one or more speech signals based on, at least in part, the local language model and the local acoustic model.

Figure 3A:
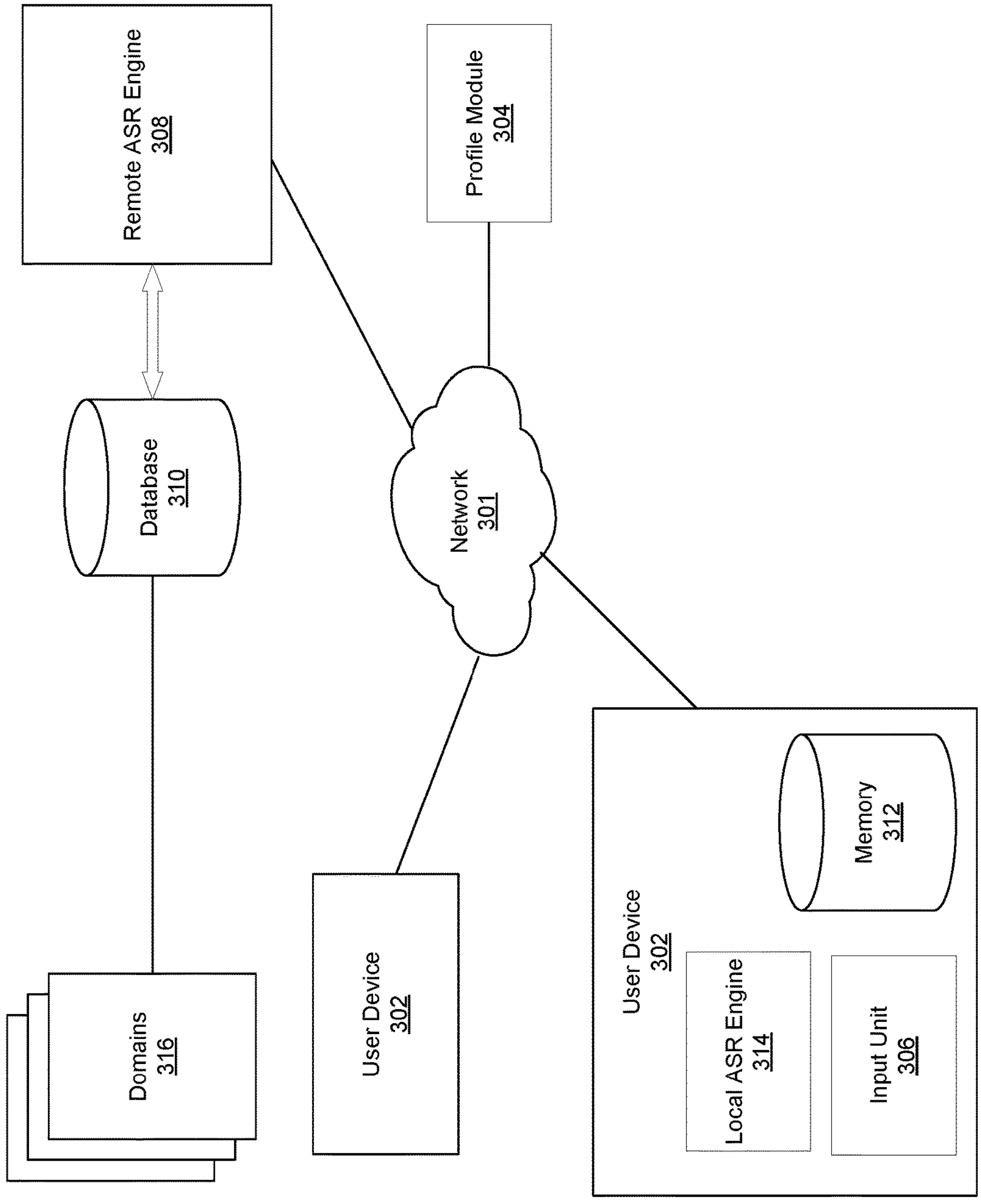
FIGS. 3A-3C are example schematic views of speech processing systems for providing speech recognition, according to example implementations of the disclosure.
Figure 3B:
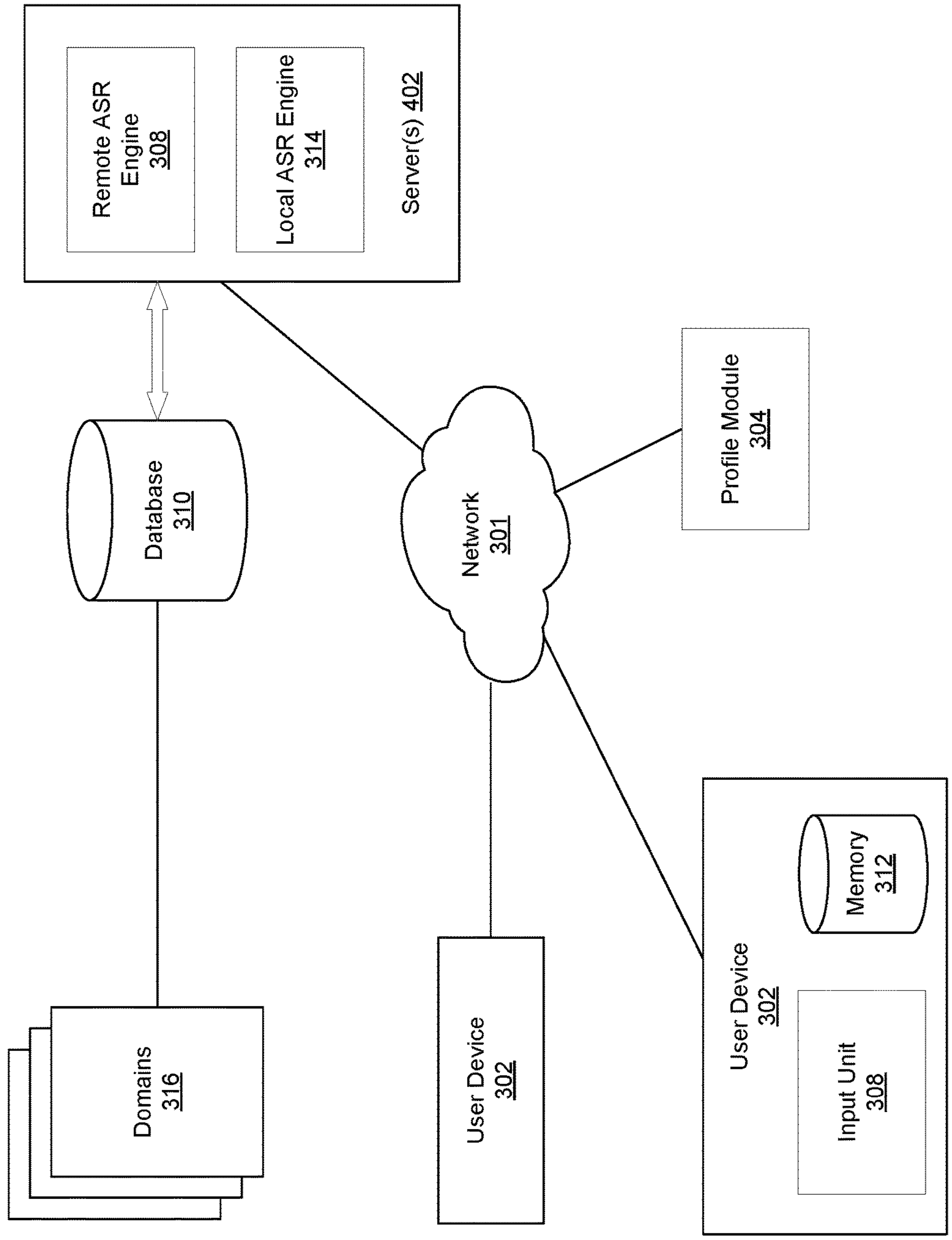
Figure 3C:
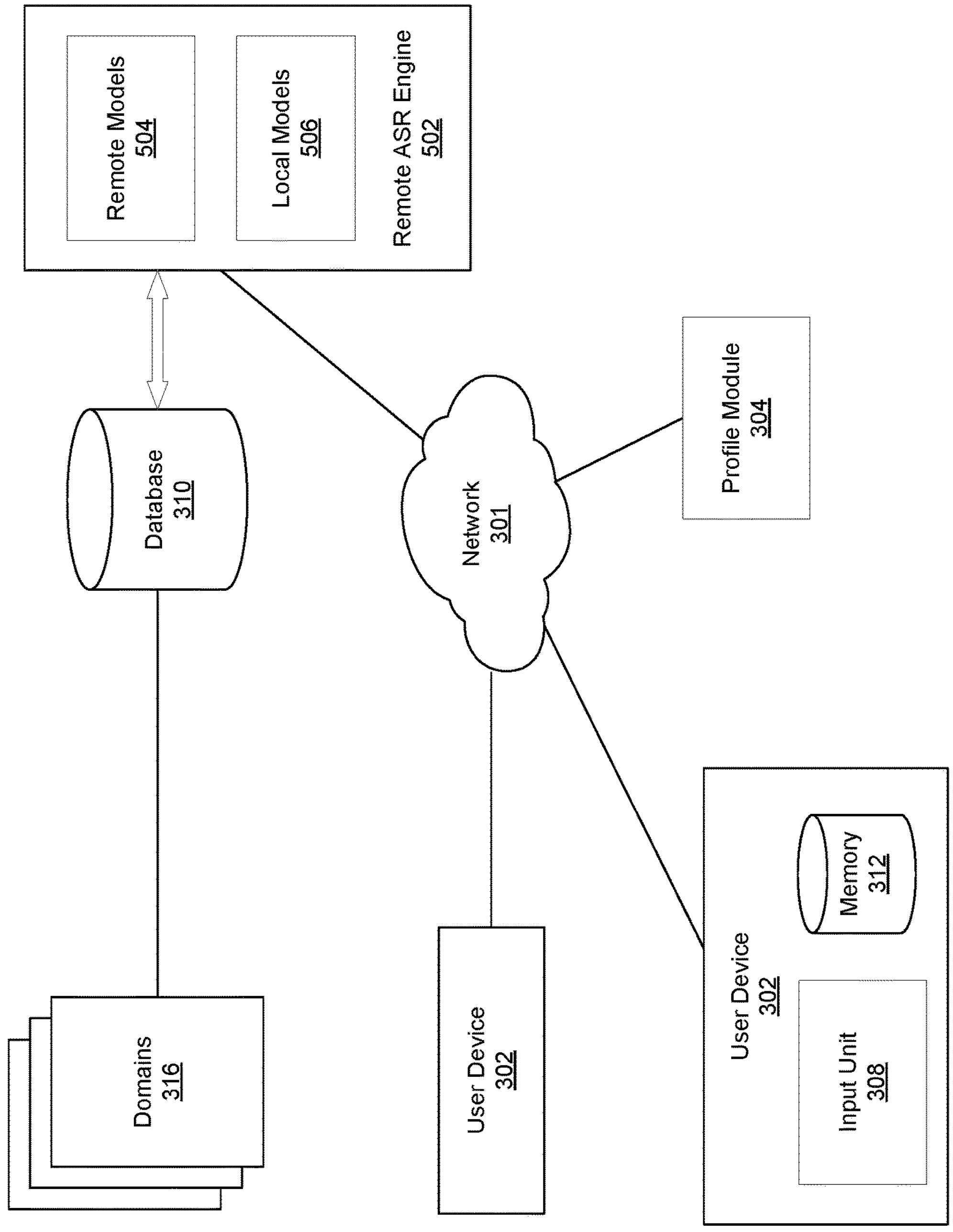

Referring to the example implementations of FIGS. 3A-3C, schematics are shown of speech processing systems or speech recognition systems (hereinafter, sometimes, simply referred to as "system" and generally referred by the numerals 300, 400, or 500), in accordance with one or more embodiments of the present disclosure. As shown, the system 300, 400, 500 may include a network 301 to communicatively connect the various components thereof. The network 301 may be similar to network 14 (as described in reference to FIGS. 1-2 above), and any of the components shown in FIGS. 3A-3C may include at least a portion of speech recognition process 10. FIGS. 3A-3C show example configurations but other configurations may be used such that the components may be rearranged, combined, separated or other similar components may be used instead.

As shown in FIG. 3A, the system 300 may include one or more user devices, such as a user device 302 (e.g., may include but are not limited to computer 12 and/or one or more of client electronic devices 38, 40, 42, 44). Alternatively, the user device 302 may be separate from the system 300, and the system 300 may be in communication with the user device 302 to receive inputs therefrom (as discussed later). The present disclosure has been described in terms of the user device 302 being part of the system 300, but it will be appreciated that the disclosed embodiments may be applied to an arrangement of the system 300 with the user device 302 being separate therefrom and disposed in communication therewith without departing from the scope of the present disclosure. As such, any arrangement of the system 300 shown in FIG. 3A should be taken as example only and not to otherwise limit the scope of the present disclosure. In the embodiment of FIG. 3A, the system 300 is shown to include two user devices 302; however, it is understood that the system 300 may include more than two user devices or only one user device without any limitations. In some implementations, the system 300 may include a profile module 304 to manage multiple user devices 302. The profile module 304 (which may include at least a portion of speech recognition process 10) may be configured to create separate user profiles for each of the individual users of the one or more user devices 302 present in the system 300, so that the speech processing as achieved by the example system 300 may be customized for each of the user profiles. The user profiles may include user preferences (e.g., frequently uttered dialogues such as top number of frequently asked questions by user over a period of time). The preferences may span multiple domains and may be collected over the period of time. As described below, the user profile may include various information about user based on registered information (e.g., location of user, spoken language of user, user preferences, etc.) and/or user actions (e.g., user location based on geolocation, user action trends such as user purchases (e.g., preferred stores, preferred purchases), user dialogue such as frequently uttered dialogues, and the like.

In the system 300, each of the user devices 302 (which may include at least a portion of speech recognition process 10) may include an input unit 306. The input unit 306 may be configured to capture or collect one or more speech signals which may be generated as a result of the utterance of speech by the user of the user device 302. In one or more examples, the input unit 306 may be a microphone or the like. Each of the one or more speech signals may include at least one dialogue uttered by the user of the corresponding user device 302. In some examples where the user device 302 is separate from the system 300 (or otherwise), the system 300 may include a receiving module to receive speech signals from the input units 306 of the user devices 302.

The system 300 may further include a remote automated speech recognition (ASR) engine 308. The remote ASR engine 308 may be a cloud-based ASR or large vocabulary ASR. The remote ASR engine 308 (which may include at least a portion of speech recognition process 10) may implement one or more large remote language models (referred to below as remote language models) and large remote acoustic models (referred to below as remote acoustic models) which could generally be implemented for processing of all possible speech signals. The remote ASR engine 308 may implement multiple speech recognizing techniques which may be executed independently (or simultaneously, etc.) for processing the one or more speech signals. In some examples, the remote ASR engine 308 may be executed remotely from the user devices 302. In the example system 300, the remote ASR engine 308 may be arranged in communication with the input units 306, via the network 301, of each of the one or more user devices 302 to receive the corresponding one or more speech signals. In some embodiments, at least a portion of the remote ASR engine 308 may be executed locally in the user device 302.

The remote ASR engine 308 may be implemented in hardware, firmware or software, or some combination of the same. The functionality associated with any particular processing system may be centralized or distributed, whether locally or remotely. The remote ASR engine 308 may be a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The one or more remote language models and remote acoustic models associated with the remote ASR engine 308 may be stored in and retrieved from a database, such as a database 310 (as shown in FIG. 3A). The database 310 may include one or more non-transitory computer-readable storage media that may be read or accessed by other components in the device. The database 310 may be any computer-readable storage media, including volatile and/or non-volatile storage components, such as optical, magnetic, organic or other memory or disc storage, which can be integrated in whole or in part with the device. In some examples, the database 310 may be implemented using a single physical device (e.g., optical, magnetic, organic or other memory or disc storage unit), while in other embodiments, the database 310 may be implemented using two or more physical devices without any limitations.

In the system 300, the remote ASR engine 308 may be configured to extract dialogues from the one or more speech signals as received from the input units 306 of each of the one or more user devices 302. In some implementations, the dialogues may be extracted by isolating speech points from the speech signal and, optionally, involve reducing noise therefrom. The remote ASR engine 308 may be further configured to identify frequently uttered dialogues over a period of time by each of the users of the one or more user devices 302. The frequently uttered dialogues may be individual user language and/or commonly spoken conversations (e.g., frequent questions, statements, etc.) from user. Further, the period of time may vary based on parameters set on the user profile (e.g., morning time frame, day time frame, week time frame, event-based time frame, etc.) and may further be dependent on time taken to receive a minimum number of dialogues for processing for each user profile (e.g., threshold of data needed for ASR to be able to accurately generate a model based on frequent dialogue). More specifically, the threshold of data needed for ASR to be accurate is based on, at least partially, statistical accuracy results of the ASR (e.g., less than about 80% to 85% accuracy or word error rate of about 10% or higher which may be considered degraded performance). If the time period does not have minimum number of dialogues needed for this threshold for processing (e.g., insufficient amount data for accurately determining frequently uttered dialogues for processing) then the system 300 may use a generic model for processing each user profile (e.g., generic or typical language use in morning time period). In another example, if there is insufficient data, the system 300 may use total data of other users monitored by system for same or similar time period (e.g., morning time period) along with weighting procedure across the user data for determining top dialogues. This may be applied across all domains or within individual domains. This way, the system 300 may generally learn habits of a user through learning common or frequently spoken conversations (also referred to as frequently uttered dialogues).

Such frequently uttered dialogues by the user may be associated with the corresponding user profile (e.g., frequently uttered dialogues may be associated with a user profile that may have a user profile identification (ID)) as part of user device (e.g., having user device ID) such that the user profile relates to all of the software applications on the user device (e.g., user profile ID may be linked to user device ID such that all activity on the device including frequently uttered dialogues by user may be linked to user device ID). Further, processing on the device (especially all speech recognition processing) may use the user profile in assisting with this processing (e.g., processing of incoming speech). In another example, frequently uttered dialogues associated with user profile (e.g., having the profile ID) may be part of a user registered account (e.g., having user account ID) for each software application such that the user profile may be specific to use of the corresponding software application (e.g., user profile ID may be linked to corresponding user account ID such that all activity on the software application including corresponding frequently uttered dialogues may be linked to user account ID). With this example, there may be multiple user profiles (e.g., each having different profile IDs) that may be part of different user accounts corresponding to respective software applications. Further, processing for each application may use the corresponding user profile in assisting with this processing (e.g., processing of incoming speech related to use of corresponding application) such that all frequently uttered dialogue of the user device may be segmented and associated with different software applications. For this example where each user profile is linked to a different user account, the same user profile may be utilized with multiple user devices as the link is to the user account of the corresponding software application and not the user device (e.g., not linked to the user device ID of the user ID).

According to example embodiments of the present disclosure, the remote ASR engine 308 may be configured to generate a small language model (referred to below as a local language model) and a small acoustic model (referred to below as a local acoustic model) for each of the users based on the identified frequently uttered dialogues by the corresponding user. Generally, the generated local language model and the local acoustic model may include models which may be sufficient for processing (e.g., processing within threshold for user device in terms of memory and processing limitations or quality threshold) the frequently uttered dialogues from the speech signals by the corresponding user. Further, the remote ASR engine 308, in coordination with the profile module 304, may associate the generated local language model and the local acoustic model with the user profile of the corresponding user e.g., local language model and local acoustic model may be linked to the user via the user profile which may be linked to the user device (e.g., user profile ID may be linked to user device ID) such that the user profile extends and relates to all software applications on the user device or linked to the user registered account for a distinct software application (e.g., user profile ID may be linked to corresponding user account ID for the software application) such that user profiles are account specific for each software application. In some implementations, the remote ASR engine 308 may implement the remote language model and the remote acoustic model for extracting the dialogues from the one or more speech signals. In some implementations, the generated local language model and the local acoustic model may be subsets of the remote language model and the remote acoustic model, respectively.

In one or more example embodiments, each of the one or more user devices 302 may include a memory, such as a memory 312 (as shown in FIG. 3A). The associated local language model and the local acoustic model may be stored in the memory 312 of the user device 302 linked with the user profile of the corresponding user. The memory 312 may include any of the above-noted example storage devices that can be read or accessed by other components in the device. The memory 312 may be any computer-readable storage media, including volatile and/or non-volatile storage components, such as optical, magnetic, organic or other memory or disc storage, which can be integrated in whole or in part with the device. In some examples, the memory 312 may be implemented using a single physical device (e.g., optical, magnetic, organic or other memory or disc storage unit), while in other embodiments, the memory may be implemented using two or more physical devices without any limitations.

Further, the system 300 may include a local ASR engine 314. The local ASR engine 314 (which may include at least a portion of speech recognition process 10) may be associated with the user profile and may utilize the corresponding generated local language model and the local acoustic model. In some embodiments, as shown in FIG. 3A, the local ASR engine 314 may be part of and executed in the user device 302. Further, the local ASR engine 314 may be in communication with the input unit 306 of the corresponding user device 302 to receive the one or more speech signals. In some embodiments, as shown in FIG. 3B and described below, the local ASR engine 314 may be run, at least partially, external to the user device as shown in FIG. 3B such that the local ASR engine 314 may be separate from the user device 302 and disposed in communication with the input unit 306, e.g., via the network 301, of the user device 302 without departing from the scope of the present disclosure. The local ASR engine 314 may be configured to process the one or more speech signals from the input unit 306 based on the local language model and the local acoustic model. In other embodiments, as shown in FIG. 3C and described below, the local ASR engine 314 may be eliminated and instead use a remote ASR engine 502 in communication with the user device 302 via the network 301.

In one or more example embodiments, other systems 400, 500 (e.g., speech processing systems or speech recognition systems) are shown in FIGS. 3B-3C. Systems 400, 500 (which may include at least a portion of speech recognition process 10) are similar to system 300 but with a different arrangement of the local ASR engine 314 and related functionality. Specifically, whereas the local ASR engine 314 is positioned within the user device 302 in FIG. 3A, the same local ASR engine 314 is either moved outside the user device as shown in FIG. 3B or the local ASR engine 314 is eliminated and replaced with a remote ASR engine 502 as shown in FIG. 3C. For the implementations of FIGS. 3B and 3C, although the local ASR engine 314 was removed from the user device 302, it is still beneficial to generate the local ASR engine 314 and/or local models 506 separate from the remote ASR engine 308 and/or remote models 504, respectively. Using the smaller local ASR engine 314 and/or local models 506 instead of the larger remote ASR engine 308 and/or remote models 504 provides an improvement in accuracy for speech recognition processing. For example, smaller models based on, at least in part, 2,000 to 20,000 words may have a quality percentage range of about 90% to 95% whereas larger models based on, at least in part, 200,000 words may have a quality percentage of about 80% to 85%. With the smaller local models, the data may be more compact allowing for optimization of accuracy as there is less data to consider. Also, use of smaller local models provides optimized processing as less resources are needed for processing.

In FIG. 3B, for example, the system 400 may include one or more servers 402 that may include the remote ASR engine 308 and the local ASR engine 314. In some examples, at least a portion of the local ASR engine 314 may run on the user device 302. In some implementations, the remote ASR engine 308 may utilize a deep neural network. In some implementations, the local ASR engine 314 may utilize Hidden Markov Model (HMM) techniques. The one or more servers 402 may be arranged in communication with the user devices 302 via the network 301.

In FIG. 3C, for example, the system 500 may include a remote ASR engine 502 that is similar to the remote ASR engine 308. The remote ASR engine 502 may also include same or similar functionalities as the functionalities of the local ASR engine 314 to be used with user device via the network 301. Whereas the remote ASR engine 308 may send local models (e.g., local language model and local acoustic model) to the user device, the remote ASR engine 502 may retain at least part of these same or similar local models 506 for later use. The remote ASR engine 502 may also include remote models (e.g., remote language model and remote acoustic model) which may be used in generating the subset of local models (e.g., local language model and local acoustic model). In some implementations, the remote ASR engine 502 may utilize a classical mix of techniques with a neural network (e.g., DNN hybrid). In some examples, at least a portion of the local models 506 may be stored and executed on the user device 302. The remote ASR engine 502 may be arranged in communication with the user devices 302 via the network 301.

Like the remote ASR engine 308, the local ASR engine 314 may be implemented in hardware, firmware or software, or some combination of at least two of the same. It should be noted that the functionality associated with any particular processing system may be centralized or distributed, whether locally or remotely. The local ASR engine 314 may be a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a micro-controller unit (MCU), a hardware accelerator, a special-purpose computer chip, or the like.

As discussed earlier, the generated local language model and the local acoustic model may be subsets of the remote language model and the remote acoustic model, respectively. In some implementations, the local language model and the local acoustic model may be relatively less complex and extensive as compared to the remote language model and the remote acoustic model (as executed by the remote ASR engine 308). In some contexts, the local ASR engine, and the corresponding local language model and the local acoustic model have been termed simply as ASR engine, and language model and acoustic model; and the remote ASR engine, and corresponding remote language model and the remote acoustic model have been termed as larger ASR engine and larger language model and larger acoustic model (or large ASR engine, large language model, or large acoustic model, respectively).

In one or more example embodiments of the present disclosure, the remote ASR engine 308 may be configured to categorize the dialogues into different domains (generally represented, for example, as stacks and designated by the numeral 316), which may become part of the local language model and the local acoustic model associated with the local ASR engine 314. In the example context of the speech processing system 300 for speech recognition, some examples of the domains 316 may include one or more of food, entertainment, sports, scheduling (e.g., assistance with calendar), sales inquiry, and automation commands. It shall be appreciated that the listed examples are not exhaustive, and the remote ASR engine 308 may categorize the dialogues into many other different domains without any limitations. In some examples, the domains 316 may be selected based on the habits of a user through learning common or frequently spoken conversations; e.g., the topics and sub-topics which the user may be most interested in based on past conversations of the user with the system 300.

In some embodiments, the remote ASR engine 308 may be further configured to rank the categorized dialogues in each of the domains 316 based on a frequency of utterance of each of the dialogues by the user over the period of time (e.g., frequency as a percentage of all dialogues per year, per month, per week, per day, per hour, etc.). As discussed earlier, the period of time may vary based on parameters set on the user profile and may further be dependent on time taken to receive a minimum number of dialogues for processing for each user profile. The frequency may be updated continuously in real time such that the ranking of dialogues may also be updated in real time as new data is inputted/received by the user and monitored over time. The period of time used may be longer or shorter (e.g., day vs. week) depending on historical available during time periods. From the available set of dialogues, the dialogue with a higher frequency of utterance may be ranked higher as compared to the dialogue with a relatively lower frequency of utterance in the corresponding domain 316. Further, the remote ASR engine 308 may be configured to identify a predefined number of dialogues with high rankings in each of the domains 316 as the frequently uttered dialogues, which may be then utilized for generating the local language model and the local acoustic model. This process of ranking dialogues based on frequency may be run continuously in real time such that the local language model and local acoustic model may be updated in real time when possible.

For example, FIGS. 4A-4C show example ranked tables of dialogue topics, dialogue sub-topics, and dialogues. The remote ASR engine 308 may identify these example ranked tables of dialogue topics, dialogue sub-topics, and dialogues that may be used in generating the local ASR engine 314 (e.g., specifically generating the local language model and local acoustic model of the local ASR engine 314 based on these ranked dialogue topics, dialogue sub-topics, and dialogues) continuously in real time. As shown in FIG. 4A, a top five (5) items may be used by the remote ASR engine 308 to generate a local language model stored in the form of a ranked table of dialogue topics based on a frequency percentage. The remote ASR engine 308 may identify, e.g., the top five dialogue topics based on a frequency percentage (as shown in FIG. 4A) for generating the local ASR engine 314 based on this ranked list. The remote ASR engine 308 may also identify, e.g., the top five dialogue sub-topics for top topics (e.g., Sports was #1 topic) based on a frequency percentage (as shown in FIG. 4B) for generating the local ASR engine 314 based on this ranked list of dialogue sub-topics for Sports and/or other topics. The remote ASR engine 308 may further identify, e.g., the top five dialogues based on a frequency percentage (as shown in FIG. 4C) for generating the local ASR engine 314 based on this ranked list of dialogues. FIGS. 4A-4C show some examples of how the dialogue topics, dialogue sub-topics, and dialogues may be ranked. Other ranking examples and/or example ranked tables (including any number of rankings) may be used without departing from the scope of the present disclosure.

The size of the local ASR engine 314 may be dependent on the size of the processor and/or the size memory of the user device. In other examples (such as implementations in FIGS. 3B and 3C), the size of the local ASR engine 314 and/or local models 506 may be dependent on the preferred quality threshold percentage (e.g., 90-95% quality). As the size increases, the quality percentage may decrease such that the threshold percentage may be used to limit size of models from increasing above this threshold. Continuously ranking of dialogue topics, dialogue sub-topics, and dialogues generally may be used for determining cut-off for which dialogues of total dialogues may be used in generating the local language model and local acoustic model. This cut-off may change continuously based on, at least in part, rankings that are updated in real time and based on events (e.g., event-related dialogue may be relevant to rankings during specific time periods leading up to event whereas this same event-related dialogue may not be relevant after event occurs—e.g., limited to no percentage of models).

These ranking examples may be applied to various software applications and software systems. For example, ranking may be used to trigger opening of applications, giving of commands to a software system (e.g., operating system, virtual machine system, and the like), or using applications. Ranking may be based on one or more criteria, as described above, for ranking system provided/installed applications. Some criteria may include, but is not limited to: simple usage pattern based on frequency (e.g., frequent dialogue-related use of application such as frequency of a third party application such as a purchasing application (e.g., Amazon® software application), frequent user topics, frequent user phrases, etc.); complex weighted frequency (e.g., using neural network to determine weighted frequency list, use least mean square process, and the like); weights may be derived from time (e.g., time of day), date, and calendar events coupled with frequency of usage (e.g., weights may be used with respect to upcoming event that may be higher or lower with respect to how close in time the event is to occur e.g., week away may be weighted as ten times (10×) whereas two days away may be weighted as fifty times (50×)); weights may be derived from notifications and alerts (e.g., weights may be used with respect to importance of notification and alert which may be pre-determined (e.g., as configured by user's or administrator's preferences) or may be based on default values for the notifications and alerts); and weights may be derived from geolocation (e.g., dialogue related to stores or businesses closer in location to user may be weighted higher than other stores or businesses further in distance from location of user). For example, weights derived from time of day may be defined as associated frequent patterns of user during a specific time of day such as morning or specific time period (e.g., Winter season such as frequent dialogue used during Winter may be dialogue about winter sports such as skiing or dialogue about winter supplies).

The ranking usage may then be used in model creation (e.g., continuously in real time). For example, a list of rankings may be generated where the most weighted rank may be first while the least weight may be last (or vice versa). This ranking may be used to capture language models associated with top weighted items that may be used to trigger applications or use of applications (e.g., processing recognition of dialogue used when engaging application which may lead to executable actions). For example, where time of day (e.g., morning) is being monitored, system may determine that user may have a pattern of frequently asking about weather and/or using a weather application in the morning. The system may then predict that frequently used language associated with the weather application may be incorporated into language model for the local ASR engine ready to be used each morning in triggering the weather application (and relevant features of the weather application). By way of example, the table in FIG. 4A may refer to topics relating to different software applications (e.g., sports application, weather application, food application, and so forth) such that associated language with these top applications may be available to local ASR engine in language model in order to trigger these applications (e.g., frequent "command" related language in addition to frequent dialogue may be available to local ASR engine that may be used to trigger applications and/or trigger portions of the applications such as specific actions/tasks in application) as well as may be used in providing local ASR engine with relevant language for moving through application in terms of dialogue. The rankings may be determined constantly in real time such that some software applications may have a larger percentage of generated models during certain times whereas the same software applications may have a smaller percentage or no percentage of the generated models during other parts of the day (e.g., user frequently uses weather application in the morning but rarely uses weather application in the evening, thus models may have a relatively large percentage of weather application dialogue available in the morning but possibly little to no percentage of weather application dialogue available in the evening).

Weighting may be applied in a hierarchical manner. For example, weighting may be initially applied towards all dialogue that the remote ASR engine has monitored and recorded for determining ranked top topics for a period of time, then may apply weighting to all dialogue within top tier topics to determine top sub-topic dialogue, then apply weight to top sub-topic dialogue, all dialogue in general to determine top sentences and words across all topics, dialogue specific to use of a software application for determining top menus and/or top submenus, etc. In generating models, for topics, sub-topics, menus, and/or sub-menus, only dialogue within root items (e.g., top of hierarchy) may be relevant and may be used in generating the models continuously in real time. As discussed, determining root items may be over entire historical data of the user, around a specific time of day (e.g., morning), or any time of day as the system functions continuously in real time (and when network is accessible), etc. This process of determining root items (e.g., ranking and categorizing) may occur continuously in real time as data is updated in real time. Where there is an upcoming event (e.g., birthday) expected to occur within a pre-determined time frame (e.g., one month, 2 weeks, 5 days, one day, etc.), event-related dialogue may be additionally weighted compared to other dialogue based on time period till event (e.g., one month weighted as 5×, 5 days weighted 10×, one day weighted 60×). The weighted event dialogue may also be compared to repeated dialogue (e.g., repeated dialogue may be weighted based on how many times this dialogue was repeated within a time period with respect to other dialogue) such that event dialogue may be higher or lower than repeated dialogue depending on how high the repeated dialogue is weighted compared to how high the event dialogue is weighted (e.g., event dialogue may be weighted higher as the time frame becomes closer to the event). In general, the weighting process may be used to compare repeated dialogues related to topics, subtopics, menus, submenus, and dialogues themselves against one another using statistics to determine top topics, subtopics, menus, submenus, and/or dialogues over all dialogue (or portion of dialogue for domain). For example, depending on weighting and statistics, in some examples dialogue or topics being repeated five (5) times may be considered frequent in one scenario (e.g., where most other dialogues or topics are only repeated once) whereas dialogue or topics repeated fifteen (15) times may be not be considered frequent in another scenario (e.g., where dialogue historical data set over several months may include top dialogues as being repeated between forty (40) to one hundred (100) times). Further, where there is the upcoming event, the event-related dialogue may be moved into rankings (position in rankings may be based on how soon event is to occur and weighting of other dialogues based on frequency).

Overall, the ranking process along with model generation may be performed constantly in real time in hierarchical form such that percentage of dialogue relating to applications may change throughout day (or even throughout the week). Further, within the generated models (e.g., language model and acoustic model) of each software application, the percentage of dialogue relating to one menu over other menus and percentage of dialogue relating to one submenu over other submenus may change constantly in real time (e.g., based on historical data that may indicate that user uses one menu or one submenu more often than other menus or submenus, respectively). Again, the rankings and thus the generated models may change constantly in real time based on historical data providing a sliding window at different hierarchical levels (e.g., at topic level, subtopic level, software application level, menu level, and submenu level, etc.).

As this process may be performed continuously in real time, the ranking may change throughout different time frames such as throughout a week or throughout a day. For example, where there is an upcoming event, rankings of dialogue may change throughout the day (e.g., purchasing application is typically used every day from 3 pm to 4 pm for buying groceries such that less or none of any event-related dialogue may be pulled into models as there may be little to no space available during this time slot but the purchasing application is typically not used after 5 pm thus more or all of the event-related dialogue may be pulled into models after 5 pm). As the upcoming event is closer in time and depending on available resources, a larger percentage of the event-related dialogue may be generated into models as compared to other typically ranked dialogues (e.g., this may be determined statistically or by other mechanisms (e.g., neural network) based on relationship of dialogue in terms of weighting). Some frequently repeated dialogue may be typically weighted higher and ranked higher than event-related dialogue as this dialogue may have occurred enough times over an extended period of time to be prioritized higher in terms of need over the event-related dialogue. In summary, this system generates sliding models that change in real time based on historical data (e.g., constantly changing language model and acoustic model). Weighting of event-related dialogue may be removed from being considered in models after the event occurs.

Rankings may be utilized within one or more software applications. Within a software application, several interactions may be possible. For example, ranking may be subdivided based on domains (e.g., topics) and sub-domains (e.g., sub-topics) using same weighting criteria as described above resulting in a similar weighted list of domains or sub-domains. Whereas previous examples may relate to monitoring past actions of user and generating rankings over one or more software applications, examples within software applications may similarly relate to monitoring past actions of user and generating rankings within each software application. For example, ranking within the software application may be based on a menu feature of the software application. The menu feature may be defined as a list of main functions that relate to software application. For this menu example, a first level of information may be obtained from a menu layout of the software application. Further, the software application may interact with a user through a set of menu commands. Given the possibility that the software application may be interacted via voice commands, generating the language model for the local ASR engine may capture the highest level of most frequently used menus or set of menus. Selection of the frequently used menus may be based on the above described ranking weight criteria. By way of example, the table in FIG. 4B may refer to sub-topics relating to menus within the software application (e.g., sports application may include menus such as football, baseball, soccer, and so forth) such that associated language with these top menus of the sports application may be available to the language model of the local ASR engine in order to interact with the functionalities of these different menus (and recognize related dialogue).

A software application may use point of interest (POI) searching. POI searching may include a list of most frequently searched POIs by a user to be used for generating and/or updating the language model (e.g., specifically updating dialogue commands associated with the language model of the local ASR engine). For example, the system may monitor, in the device calendar, that a user has an upcoming event (e.g., marriage anniversary). A POI-dependent language model may be generated and/or updated with respect to this upcoming event. Based on history of the user, the POI language model may be used to predict and anticipate user actions within the application (e.g., based on history of user, it may be likely that the user may purchase items from a florist, a gift shop, a romantic restaurant, etc. for the marriage anniversary). Specifically, the POI language model may be generated and/or updated based on the user's history with marriage anniversary events or other events which may be transferred to the local ASR engine of the device for improved recognition accuracy when using the local ASR engine remotely (e.g., on a remote device).

Further, in examples, rankings may be utilized within application subdomains or submenus of one or more software applications. Within each menu feature, there may be subdomains or submenus. For example, a software application may include a "Help" menu (e.g., "Help" functionality) that may include submenus or sub-functionalities such as help on payments, help on content, help on new content, etc. (e.g., these submenus may be ranked by frequency in a table as similarly described above and as shown in tables of FIGS. 4A-4C). Subdomain or submenu interactions may be used to generate and/or update language models to improve user's subcategory interaction within the application. For example, the remote ASR engine may generate and/or update language models of the local ASR based on e.g., top ten menu items and e.g., top five or top ten submenus (of one or more menu items) (e.g., relevant language from these menu items and submenus may be incorporated into the language models as it may likely be needed by the local ASR engine). In some examples, the rankings may be based on a subdomain word list using same weighting criteria as described above. For example, within the software application, there may be a sub-category of interactions. Using frequency of usage, a sub-category language mode may be generated and transferred to local ASR engine 314 (e.g., onto user device 302). For example, with a map type of software application, the user may be interested in searching for a POI restaurant during a specific period of time (e.g., afternoon). Further the user may search for a type of restaurant (e.g., Asian restaurant) most frequently attended. Dialogue interactions may result in generation and/or update to language models that may be related to frequently attended type of restaurant (e.g., Asian restaurant) that may be searched, then triggered and sent to local ASR engine 314 of the user device 302 (e.g., based on previous usage and patterns). In summary, the language model may be generated and/or updated in real time based on general previous actions (voice related commands, haptic commands, etc.) as well as previous actions with context (e.g., what actions were frequently taken around event such as an anniversary or actions that frequently occurred around a time of day) that may be sent to local ASR engine on the user device. Further, the models may be generated based on, at least partially, rankings of domains and/or sub-domains (e.g., rankings of topics, subtopics, software applications, menus, submenus, etc. continually in real time).

In some examples, within applications, there may be different types of menus where each menu has a different layout. This may relate to ranking of menu items and submenu items for generating or updating the language model. This may be run iteratively across menus and submenus (e.g., across a tree of menus and submenus). Over time, relevant terminology from top menus and submenus may be added to the language model such that at least top commands for triggering menus or submenus may be in the language model of the local ASR engine. The language model may also incorporate synonyms related to these commands, terms, and/or related language of the menus and submenus such that the local ASR engine may have improved accuracy or recognition. As described above, POI searching (e.g., regarding events, location of user, time of day, etc.) may be used in some examples. Based on monitoring of previous usage of an application (e.g., purchasing application), system may determine various patterns (e.g., ranked list) such as trend of user to buy sports items, trend of user to buy certain items based on events (e.g., flowers on anniversary), trend of user to buying gifts from particular stores, and/or trend on where (e.g., frequent location) to buy gifts. The system may proactively use a remote ASR engine to fetch frequent voice commands, related language, and synonyms in generating and updating the language model which may be transferred to the local ASR engine (e.g., user's device). These voice commands and other language relate to predicted actions and speech that may likely be part of user's dialogue based on an upcoming event, user's use of the software application, etc. This may improve recognition of user's speech remotely as local ASR engine may have access to these predicted voice commands and related speech within the language model (e.g., improved functionality with ranked list of hypothetical voice commands and language based on frequency, upcoming events, notifications, time of day, etc.).

In another example, where weights may be derived based on events, the system may monitor that an upcoming event is about to occur (e.g., upcoming birthday for a family member). Further, based on history of user's actions (e.g., shopping-related actions), the system may determine that the user typically uses a specific application most frequently (e.g., purchasing application such as Amazon® software application) for gifts (e.g., specifically birthday gifts) or in general for purchasing items. Accordingly, as the system anticipates the upcoming event, the language model may be updated to include top language used in triggering the purchasing application (e.g., language model may be generated and/or updated based on related voice commands of which are available for opening/starting the purchasing application). Within the purchasing application, there may be second-level commands (e.g., sublevel or submenu type commands) that may be utilized. For example, the system may generate and/or update the language model associated with buying a gift (e.g., specifically a birthday gift) from the cloud (e.g., remote ASR engine) which may be transferred to the local ASR engine (e.g., language model may be generated and/or updated based on past used language for selecting gifts such as birthday gifts through the purchasing application). This may improve system's ability to locally recognize future speech interactions via the purchasing application. Within the purchasing application, several things may be chosen such as buying a book, buying an electronic device, etc. Based on history data, the system may be able to anticipate dialogue likely relating to specific purchases due to nature of gift (e.g., birthday gift), person receiving gift (e.g., relationship of person to user), time of year (e.g., seasonal gifts), and/or user's preferred gift purchases such that the language models may be generated and/or updated accordingly. For example, if user is buying birthday gift for the user's wife, relevant language (e.g., based on history) may include jewelry, perfume, wife's preferred stores or designers, etc. That is, the system may use a calendar for anticipating upcoming events (e.g., birthdays) that have associated data mining related language based on actions (e.g., related language to shopping for birthday items).

The present disclosure also relates to an example method for processing speech. Various embodiments and variants disclosed above apply mutatis mutandis to the method. FIG. 5 is a flowchart depicting the steps involved in the speech recognition process 10 for processing speech, according to embodiments of the present disclosure. Although the speech recognition process 10 is shown and described as a sequence of steps, its contemplated that various embodiments of the speech recognition process 10 may be performed in any order or a combination and need not include all of the shown steps, and may include various other steps.

In some implementations, speech recognition process 10 may capture 402 one or more speech signals. Each of the one or more speech signals may include at least one dialogue uttered by a user. In some implementations, speech recognition process 10 may extract 404 dialogues from the one or more speech signals. As part of extracting 404 dialogues, the speech recognition process 10 may implement 405 a remote language model and a remote acoustic model for extracting dialogues from the one or more speech signals. In some implementations, the speech recognition process 10 may categorize 412 dialogues into different domains. As discussed, the domains may include one or more of food, entertainment, sports, scheduling (e.g., assistance with calendar), sales inquiry, automation commands, etc. Also, speech recognition process 10 may rank 414 the categorized dialogues in each of the domains based on, at least in part, a frequency of utterance of each of the dialogues by the user over the period time (such that dialogues with higher frequency of utterance are ranked higher compared to dialogues with relatively lower frequency of utterance in corresponding domain). In some implementations, speech recognition process 10 may identify 406 frequently uttered dialogues over a period of time. Frequently uttered dialogues may be a set of dialogues that are uttered by the user a number of times during the period of time more than other dialogues uttered by the user during the period of time. As part of identifying 406 frequently uttered dialogues, the speech recognition process 10 may identify 407 predefined number of dialogues with high rankings in each domain as the frequently uttered dialogues. In some implementations, speech recognition process 10 may generate 408 a local language model and a local acoustic model based on, at least in part, the identified frequently uttered dialogues. In some implementations, speech recognition process 10 may store the generated local language model and the local acoustic model for later retrieval. In some examples, the local language model and the local acoustic model are subsets of the larger remote language model and the larger remote acoustic model, respectively (e.g., in some implementations, the remote language model and remote acoustic model may be implemented to generate the smaller local language model and smaller local acoustic model). In some implementations, the speech recognition process 10 may associate 416 the local language model and the local acoustic model with a user profile of the corresponding user. A separate user profile may be created for each of the individual users of one or more user devices. In some implementations, speech recognition process 10 may process 410 the one or more speech signals from the user based on, at least in part, the generated local language model and the local acoustic model. It should be noted that, in some implementations, the functions noted in the block(s) may occur out of the order noted in the figures, such as FIG. 5. For example, two blocks shown in succession may, in fact, be executed substantially concurrently, or the blocks may sometimes be executed in the reverse order, depending upon the functionality involved.

In the example system 300, the remote ASR engine 308 (with remote language model and remote acoustic model) may create a local language model and local acoustic model for the local ASR engine 314, so that the local ASR engine 314 may quickly recognize the most frequently asked speech (such as, questions) by the user with higher accuracy. For example, the remote ASR engine 308 may train the local ASR engine 314 with most frequently asked questions offline and may store the local language model and local acoustic model in the memory 312 associated with the local ASR engine 308. The local ASR engine 314 may need to be much less computationally intensive to execute generated local language model and local acoustic model. Thus, for example, the system 300 may provide fast speech recognition capability to mobile, portable, and/or embedded devices. Furthermore, the remote ASR engine 308 may constantly update the memory 312 of the local ASR engine 314 with newer small local language models and local acoustic models based on any change in frequently uttered dialogues by the user associated with the corresponding user profile, to maintain the system 300 generally responsive to user queries. For example, the remote ASR engine 308 may create a small local language model and a small local acoustic model (e.g., acoustical adaptation) for the local ASR engine 314 such that the local ASR engine 314 stores frequently uttered dialogues by user and then caches this information over time (e.g., every hour). In some examples, as part of maintaining the system 300 over time, the remote ASR engine 308 may delete or overwrite models and/or data of models (e.g., data within language model and acoustic model) that are no longer relevant (e.g., event occurred such that event-related dialogue may no longer be relevant) or data is no longer identified as "frequent" (e.g., dialogue itself or dialogue topics are no longer in top rankings).

In some examples, the local ASR engine 314 may be a copy, clone, or cache of at least part of the remote ASR engine 308 (e.g., generated smaller local language model and smaller local acoustic model may be copies, clones, or caches of at least part of the remote language model and remote acoustic model, respectively). For example, the smaller local language model and smaller local acoustic model may be a cache of top 100 or top 20 frequently used conversations, frequently spoken demands, frequent utterances (e.g., most often used speech), frequently used phrases, frequent queries, and/or frequently asked questions. The local language model and local acoustic model may be adapted over configured time or real time for the local ASR engine 314 e.g., as models and data changes over time. The size of the local ASR engine 314 may be based on storage size (e.g., CPU RAM storage) or preferred threshold quality percentage.

The different embodiments of speech processing systems, as disclosed in the present disclosure, may provide efficient processing of speech signals by reducing complexity by implementing local language and acoustic models. The example speech processing systems may provide improved accuracy by using smaller local models (e.g., quality may decrease when using larger remote models compared to smaller local modes) and may consume less battery power because of continuous adaptation done by the remote ASR engine for generating the smaller local models (e.g., smaller local models generated based on frequently spoken conversations such frequent questions). For example, there is less battery power consumption as less data may be stored on user device (e.g., only storing or caching frequently spoken dialogue conversations). Thus, the battery life of devices may be improved. Further, the example implementation of the speech processing systems may improve achieved speed and accuracy, as compared to regular models, since the results may be outputted without carrying out exhaustive search on all possible paths provided by larger remote models. Thus, the example speech processing systems may be adapted for applications, such as virtual assistants and the like capable of communication with the user.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A speech processing system including one or more processors and one or more memories configured to perform operations comprising:

capturing one or more speech signals, wherein each of the one or more speech signals comprises at least one dialogue uttered by a user;

extracting dialogues from the one or more speech signals;

identifying frequently uttered dialogues over a period of time, wherein the frequently uttered dialogues are a set of dialogues that are uttered by the user a number of times during the period of time more than other dialogues uttered by the user during the period of time;

determining, prior to generating a local language model and a local acoustic model and prior to providing the local language model and the local acoustic model to a user device, that a size of the local language model and the local acoustic model will result in a sufficient recognition quality threshold, wherein the size is based on, at least in part, the frequently uttered dialogues;

generating the local language model and the local acoustic model based on, at least in part, the frequently uttered dialogues when the size of the local language model and the local acoustic model will result in the sufficient recognition quality threshold when the determining indicates that the sufficient recognition quality threshold will be satisfied prior to providing the local language model and the local acoustic model to the user device;

processing the one or more speech signals based on, at least in part, the local language model and the local acoustic model, wherein extracting dialogues from the one or more speech signals further comprises implementing a remote language model and a remote acoustic model for extracting the dialogues from the one or more speech signals, and wherein the local language model and the local acoustic model are subsets of the remote language model and the remote acoustic model, respectively, wherein the local language model and the local acoustic model are executed on the user device and the remote language model and the remote acoustic model are executed remotely from the user device, wherein the processing the one or more speech signals further comprises executing a local Automatic Speech Recognition (ASR) engine on a user device to process the one or more speech signals based on, at least in part, the local language model and the local acoustic model, wherein the local language model and the local acoustic model are trained for the local ASR engine by a remote ASR engine; and receiving, by the local ASR engine, the local language model and the local acoustic model trained by the remote ASR engine after the sufficient recognition quality threshold has been determined to be satisfied.

2. The speech processing system according to claim 1, wherein the local language model and the local acoustic model are trained for the local ASR engine by the remote ASR engine offline and pushed back to the local ASR engine.

3. The speech processing system according to claim 1, wherein the operations further comprise:

categorizing the dialogues into different domains; and after categorizing the dialogues into different domains, ranking the categorized dialogues in each of the domains based on, at least in part, a frequency of utterance of each of the dialogues by the user over the period of time, such that the dialogues with a higher frequency of utterance are ranked higher as compared to the dialogues with a relatively lower frequency of utterance in a corresponding domain.

4. The speech processing system according to claim 3, wherein the identifying frequently uttered dialogues further comprises identifying a predefined number of dialogues with high rankings in each of the different domains as the frequently uttered dialogues.

5. The speech processing system according to claim 4, wherein the predefined number of dialogues are determined based on, at least in part, one or more of a memory and a processor of a user device.

6. The speech processing system according to claim 4, wherein the different domains include at least one or more of food, entertainment, sports, scheduling, sales inquiry, and automation commands.

7. A local speech processing system including one or more processors and one or more memories configured to perform operations comprising:

capturing one or more speech signals, wherein each of the one or more speech signals includes at least one dialogue uttered by a user;

determining, prior to receiving a local language model and a local acoustic model from a remote automatic speech recognition (ASR) engine, that a size of the local language model and the local acoustic model will result in a sufficient recognition quality threshold, wherein the size is based on, at least in part, frequently uttered dialogues;

receiving the local language model and the local acoustic model from the remote ASR engine when the size of the local language model and the local acoustic model will result in the sufficient recognition quality threshold after the sufficient recognition quality threshold has been determined to be satisfied;

storing the local language model and the local acoustic model, for later retrieval, wherein the local language model and the local acoustic model are based on, at least in part, frequently uttered dialogues over a period of time, and wherein the frequently uttered dialogues are a set of dialogues that are uttered by the user a number of times during the period of time more than other dialogues uttered by the user during the period of time;

processing the one or more speech signals based on, at least in part, the local language model and the local acoustic model, wherein extracting dialogues from the one or more speech signals further comprises implementing a remote language model and a remote acoustic model for extracting the dialogues from the one or more speech signals, and wherein the local language model and the local acoustic model are subsets of the remote language model and the remote acoustic model, respectively, wherein the local language model and the local acoustic model are executed on a user device and the remote language model and the remote acoustic model are executed remotely from the user device, wherein the processing the one or more speech signals further comprises executing a local ASR engine on a user device to process the one or more speech signals based on, at least in part, the local language model and the local acoustic model, wherein the local language model and the local acoustic model are trained for the local ASR engine by the remote ASR engine; and receiving, by the local ASR engine, the local language model and the local acoustic model trained by the remote ASR engine after the sufficient recognition quality threshold has been determined to be satisfied.

8. The local speech processing system according to claim 7, wherein the operations further comprise associating the local language model and the local acoustic model with a user profile of the user.

9. The local speech processing system according to claim 8, wherein the storing the local language model and the local acoustic further comprises storing the local language model and the local acoustic model in a memory of a user device linked with the user profile of the user.

10. The local speech processing system according to claim 7, wherein the remote ASR engine pushes the local language model and the local acoustic model trained by the remote ASR engine offline back to the local ASR engine.

11. A remote speech processing system including one or more processors and one or more memories configured to perform operations comprising:

receiving one or more speech signals from a user device, wherein each of the one or more speech signals includes at least one dialogue uttered by a user;

extracting dialogues from the one or more speech signals;

identifying frequently uttered dialogues over a period of time wherein the frequently uttered dialogues are a set of dialogues that are uttered by the user a number of times during the period of time more than other dialogues uttered by the user during the period of time;

determining, prior to generating a local language model and a local acoustic model and prior to providing the local language model and the local acoustic model to a user device, that a size of the local language model and the local acoustic model will result in a sufficient recognition quality threshold, wherein the size is based on, at least in part, the frequently uttered dialogues;

generating the local language model and the local acoustic model for the user based on, at least in part, the frequently uttered dialogues by the user when the size of the local language model and the local acoustic model will result in the sufficient quality threshold when the determining indicates that the sufficient recognition quality threshold will be satisfied prior to providing the local language model and the local acoustic model to the user device; and sending the local language model and the local acoustic model to the user device to be used in processing of the one or more speech signals after the sufficient recognition quality threshold has been determined to be satisfied, wherein extracting dialogues from the one or more speech signals further comprises implementing a remote language model and a remote acoustic model for extracting the dialogues from the one or more speech signals, and wherein the local language model and the local acoustic model are subsets of the remote language model and the remote acoustic model, respectively, wherein the local language model and the local acoustic model are executed on the user device and the remote language model and the remote acoustic model are executed remotely from the user device, wherein the processing the one or more speech signals further comprises executing a local Automatic Speech Recognition (ASR) engine on the user device to process the one or more speech signals based on, at least in part, the local language model and the local acoustic model, wherein the local language model and the local acoustic model are trained for the local ASR engine by a remote ASR engine.

12. The remote speech processing system according to claim 11, wherein the operations further comprise associating the local language model and the local acoustic model with a user profile of the user.

13. The remote speech processing system according to claim 12, wherein the remote ASR engine is executed remotely from the user device on at least one server.

14. The remote speech processing system according to claim 12, wherein at least a portion of the remote ASR engine is executed locally on the user device.

15. The remote speech processing system according to claim 11, wherein the operations further comprise:

categorizing the dialogues into different domains; and after categorizing the dialogues into different domains, ranking the categorized dialogues in each of the domains based on, at least in part, a frequency of utterance of each of the dialogues by the user over the period of time, such that the dialogues with a higher frequency of utterance are ranked higher as compared to the dialogues with a relatively lower frequency of utterance in a corresponding domain.

16. The remote speech processing system according to claim 15, wherein the identifying frequently uttered dialogues further comprises identifying a predefined number of dialogues with high rankings in each of the domains as the frequently uttered dialogues.

17. The remote speech processing system according to claim 16, wherein the predefined number of dialogues are determined based on, at least in part, one or more of a memory and a processor of the user device.

18. The speech processing system according to claim 15, wherein the domains include at least one or more of food, entertainment, sports, scheduling, sales inquiry, and automation commands.

* * * * *